United States Patent [19]

Iwa et al.

[11] Patent Number: 5,767,204

[45] Date of Patent: Jun. 16, 1998

[54] FLUORINE-CONTAINING ELASTOMER COMPOSITION

[75] Inventors: Riichi Iwa; Haruyoshi Tatsu, both of Ibaraki, Japan; Volkova Margarita Alexeevna, Saint Petersburg, Russian Federation; Rondarev Dmitrii Stefanovich, Saint Petersburg, Russian Federation; Sokolov Sergey Vasilyevich, Saint Petersburg, Russian Federation; Greenblat Mark Peysakhovich, Saint Petersburg, Russian Federation; Senyushov Lev Nikolaevich, Saint Petersburg, Russian Federation

[73] Assignees: Nippon Mektron Limited, Tokyo, Japan; The Central Synthetic Rubbers Research Institute, Saint Petersburg, Russian Federation

[21] Appl. No.: 543,506

[22] Filed: Oct. 16, 1995

[30] Foreign Application Priority Data

Oct. 21, 1994 [JP] Japan ................. 6-282941

[51] Int. Cl.⁶ ............................................. C08F 8/32
[52] U.S. Cl. ......................... 525/359.3; 525/326.3; 525/380; 525/381; 525/382
[58] Field of Search ..................... 525/359.3, 380, 525/381, 382

[56] References Cited

U.S. PATENT DOCUMENTS 3,933,767  1/1976  Nottke .

FOREIGN PATENT DOCUMENTS

| 0 110 420 | 12/1983 | European Pat. Off. . |
| 0 606 883 A1 | 1/1994 | European Pat. Off. . |
| 59-109546 | 12/1982 | Japan . |
| 6-263952 | 9/1994 | Japan . |

OTHER PUBLICATIONS

"Modification of High Pressure Polyethylene with Perfluorovinyl Ethers.", Machula et al, Plast. Massy (1989) 7, 21–23.

*Primary Examiner*—Bernard Lipman
*Attorney, Agent, or Firm*—Barnes & Thornburg

[57] ABSTRACT

A fluorine-containing elastomer composition, which comprises a terpolymer of tetrafluoroethylene, perfluoro(lower alkyl vinyl ether) and a perfluoro unsaturated nitrile compound represented by the following general formula:

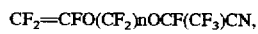

$$CF_2=CFO(CF_2)_nOCF(CF_3)CN,$$

wherein n is an integer of 2 to 5, and a bis(aminophenyl) compound represented by the following general formula as a cross-linking agent:

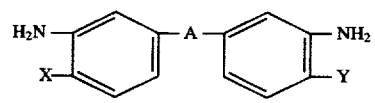

wherein A is an alkylidene group having 1 to 6 carbon atoms or a perfluoroalkylidene group having 1 to 10 carbon atoms and X and Y are a hydroxyl group or an amino group, can produce vulcanized products having good vulcanization physical properties and a good compression set.

3 Claims, 1 Drawing Sheet

FLUORINE-CONTAINING ELASTOMER COMPOSITION

BACKGROUND OF THE INVENTION

1. Field of the Invention

The present invention relates to a fluorine-containing elastomer composition, and more particularly to a cross-linkable composition of fluorine-containing elastomer having cyano groups as cross-linkable groups.

2. Related Prior Art

JP-A-59-109546 discloses a fluorine-containing elastomer composition which comprises a terpolymer of tetrafluoro-ethylene, perfluoro(methyl vinyl ether) and cyano group-containing (perfluorovinylether) represented by the following general formula:

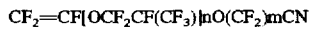

wherein n: 1–2 and m: 1–4
and a bis(aminophenyl) compound represented by the following general formula as a cross-linking agent:

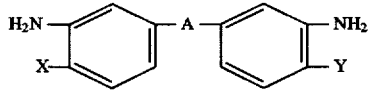

wherein A is an alkylidene group having 1 to 6 carbon atoms, a perfluoroalkylidene group having 1 to 10 carbon atoms, a $SO_2$ group, an O group, a CO group or a carbon-carbon bond capable of directly bonding two benzene rings, and X and Y are hydroxyl groups or amino groups.

However, the cyano group-containing (perfluorovinylether), copolymerized as the cross-linking site monomer in the terpolymer, is synthesized through many steps, as disclosed in U.S. Pat. No. 4,138,426 and thus is never regarded as an industrially advantageous raw material. Furthermore, the compression set is not satisfactory at an elevated temperature.

On the other hand, U.S. Pat. No. 3,933,767 discloses a terpolymer of tetrafluoroethylene, perfluoro(methyl vinyl ether) and perfluoro unsaturated nitrile compound represented by the following general formula as a cross-linking site monomer:

(wherein n: 1–5)
and also discloses that the cross-linking can be carried out with tetraphenyl tin.

The perfluoro unsaturated nitrile compound used as the comonomer component for the terpolymer can be readily synthesized from the corresponding $CN[CF(CF_3)CF_2O]nCF$ $(CF_3)COF$ with a good selectivity, but the cross-linking of the thus obtained terpolymer is carried out with highly toxic tetraphenyl tin, and thus there are still problems of industrial safety and slow cross-linking speed. Furthermore, the thus obtained cross-linked products have less resistances to water and to amine at an elevated temperature.

SUMMARY OF THE INVENTION

An object of the present invention is to provide a fluorine-containing elastomer composition capable of producing vulcanized rubber products having good vulcanization physical properties and a good compression set with a commercially available, ordinary cross-linking agent free from any safety problem, as contained therein, the composition comprising a cyano group-containing, cross-linking site monomer which can be readily synthesized with a good selectivity.

According to the present invention, there is provided a fluorine-containing elastomer composition, which comprises a terpolymer of tetrafluoroethylene, perfluoro(lower alkyl vinyl ether) and a perfluoro unsaturated nitrile compound represented by the following general formula:

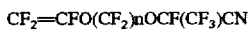

wherein n is an integer of 2 to 5 and a bis(aminophenyl) compound represented by the following general formula as a cross-linking agent:

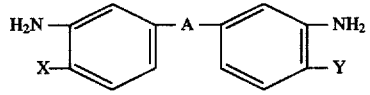

wherein A is an alkylidene group having 1 to 6 carbon atoms, or a perfluoroalkylidene group having 1 to 10 carbon atoms and X and Y are a hydroxyl group or an amino group.

DETAILED DESCRIPTION OF THE INVENTION

The terpolymer of tetrafluoroethylene, perfluoro(lower alkyl vinyl ether) and perfluoro unsaturated nitrile compound for use in the present invention includes, for example, the one comprising about 45 to about 75% by mole of tetrafluoroethylene, about 50 to about 25% by mole of perfluoro(lower alkyl vinyl ether) and about 0.1 to about 5% by mole of perfluoro unsaturated nitrile compound as a cross-linking site monomer, sum total being 100% by mole.

As the perfluoro(lower alkyl vinyl ether) for use in the present invention, perfluoro(methyl vinyl ether) is usually used.

The perfluoro unsaturated nitrile compound represented by the foregoing general formula can be synthesized through any one of the following three synthesis routes (A), (B) and (C).

Synthesis route (A)

Perfluoro unsaturated carboxylic acid ester represented by the following general formula:

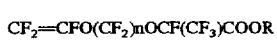

wherein R is an alkyl group having 1 to 10 carbon atoms and n is an integer of 2 to 5, is subjected to addition reaction of chlorine or bromine onto the vinyl group of the ester to obtain a halogenated perfluoro saturated carboxylic acid ester represented by the following general formula:

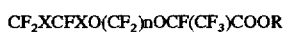

wherein R and n have the same meanings as defined above and X is a chlorine atom or a bromine atom. Then, the thus obtained halogenated perfluoro saturated carboxylic acid ester is reacted with ammonia to convert the ester group to an acid amide group to obtain an acid amide represented by the following general formula:

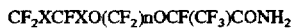

wherein X and n have the same meanings as defined above. Then, the acid amide is dehalogenated to form a vinyl group again and a unsaturated acid amide represented by the following general formula is obtained:

wherein n has the same meaning as defined above. Then, the resulting unsaturated acid amide is dehydrated to obtain a desired product.

The starting material for the synthesis route (A), i.e. perfluoro unsaturated carboxylic acid ester can be obtained by reacting a dicarboxylic acid fluoride represented by the following general formula:

$$FOC(CF_2)_{n-2}COF$$

wherein n is an integer of 2, 3, 4 or 5, with hexafluoropropene oxide to obtain a dicarboxylic acid difluoride represented by the following general formula [Angew. Chem. Int. Ed. 24, 161–179 (1985)]:

$$FOCCF(CF_3)O(CF_2)nOCF(CF_3)COF$$

wherein n has the same meaning as defined above, and then by reacting only one acid fluoride group of the resulting dicarboxylic acid difluoride with alcohol to monoesterify the dicarboxylic acid difluoride to obtain a compound represented by the following general formula:

$$FOCCF(CF_3)O(CF_2)nOCF(CF_3)COOR$$

wherein n has the same meaning as defined above and R is an alkyl group having 1 to 10 carbon atoms, and then by subjecting the other remaining carboxylic acid fluoride group to a FCOF— releasing reaction.

In the addition reaction of halogen to the thus obtained perfluoro unsaturated carboxylic acid ester, chlorine or bromine is used as a halogen, where bromine is preferable from the viewpoint of easy handling and easy reaction controllability. The addition reaction of halogen can be carried out even in the absence of a solvent, but preferably in the presence of a solvent. Any solvent can be used, so long as it can solve the raw materials and is inert to halogen. Preferably, a fluorine-containing solvent such as 1,1,2-trichloro-1,2,2-trifluoroethane (F-113), perfluoro(2-butyl-tetrahydrofuran), perfluorohexane, etc. can be used. To activate the addition reaction, the reaction can be also carried out under irradiation of light such as sun beams, ultraviolet lamp light, etc. in the presence of a fluorine-containing solvent.

Reaction of halogenated perfluoro saturated carboxylic acid ester with ammonia can be carried out even in the absence of a solvent, but preferably in the presence of such a solvent as used in the addition reaction of halogen. The reaction can be carried out under the atmospheric pressure or under pressure.

Formation of vinyl group by dehalogenation reaction of the halogenated perfluoro saturated carboxylic acid amide is carried out in a protic polar solvent such as methanol, ethanol, etc. or an aprotic polar solvent such as dioxane, tetrahydrofuran, etc. in the presence of a dehalogenating agent such as Zn, Zn/ZnCl$_2$, Zn/ZnBr$_2$, Zn/Cu, Mg, etc. Zn can be used after activation of the surface with dilute hydrochloric acid, etc.

The last dehydration reaction of the carboxyl amide group is carried out at a temperature of about 100° to about 300° C. with one of various dehydration agents such as phosphorus pentoxide in the absence of a solvent.

Synthesis Route (B)

The starting material, perfluoro unsaturated carboxylic acid ester, is directly reacted with ammonia and the resulting perfluoro unsaturated carboxylic acid amide is subjected to a dehydration reaction to obtain a desired product.

The reaction of perfluoro unsaturated carboxylic acid ester with ammonia can be carried out in the same manner as in the reaction with ammonia in the above-mentioned Synthesis route (A). Since the perfluorovinyl group ($CF_2=CF-$) is not protected in that case, there is a possibility of side reaction to form an NC—CHF— group. Thus it is necessary to control reaction conditions, particularly to keep the amount of ammonia equimolar to the raw material ester.

Dehydration reaction of the resulting perfluoro unsaturated carboxylic acid is carried out in the same manner as in the above-mentioned Synthesis route (A).

Synthesis Route (C)

Addition reaction of halogen to the starting material, perfluoro unsaturated carboxylic acid ester, and successive reaction with ammonia are carried out in the same manner as in the above-mentioned Synthesis route (A), and then the thus obtained halogenated perfluoro saturated carboxylic acid amide is subjected to a dehydration reaction to obtain a nitrile compound represented by the following general formula:

$$CF_2XCFXO(CF_2)nOCF(CF_3)CN$$

wherein X is a chlorine atom or a bromine atom and n is an integer of 2, 3, 4 or 5, and the resulting nitrile compound is subjected to a dehalogenation reaction to obtain a desired product.

The dehydration reaction and dehalogenation reaction are carried out in the same manner as in the above-mentioned Synthesis route (A).

The terpolymer comprising the foregoing components as essential ones can further contain various vinyl compounds and fluorinated olefins, as copolymerized such a degree as not to inhibit the copolymerization reaction or impair the physical properties of vulcanized products (not more than about 20% by mole).

The fluorinated olefins for use in the peresent invention include, for example, vinylidene fluoride, monofluoroethylene, trifluoroethylene, trifluoropropylene, pentafluoropropylene, hexafluoropropylene, hexafluoroisobutylene, chlorotrifluoroethylene, dichlorodifluoroethylene, etc. The vinyl compounds for use in the present invention include, for example, ethylene, propylene, 1-butene, isobutylene, methyl vinyl ether, ethyl vinyl ether, butyl vinyl ether, cyclohexyl vinyl ether, vinyl acetate, vinyl propionate, vinyl chloride, vinylidene chloride,trifluorostyrene, etc.

The copolymerization reaction can be carried out by any desired polymerization procedure such as emulsion polymerization, suspension polymerization, solution polymerizzation, bulk polymerization, etc., where emulsion polymerization is preferable from the economic viewpoint. Emulsion polymerization reaction can be carried out usually at a temperature of about 40° to about 85° C. and a pressure of about 5 to 50 kgf/cm$^2$G, using water-soluble inorganic peroxide or its redox system as a catalyst and ammonium perfluorooctanoate or the like as a surfactant, whereby a fluorine-containing elastomer having an intrinsic viscosity of about 0.05 to about 4 dl/g, preferably about 0.2 to about 1.5 dl/g (in a 1 wt. % solution of Fluorinat FC-77, a product of 3M, at 35° C.) is formed.

About 0.1 to about 5 parts by weight, preferably about 0.5 to about 2 parts by weight, of one of the following compounds is added to 100 parts by weight of the terpolymer as a bis(aminophenyl) compound represented by the following general formula.

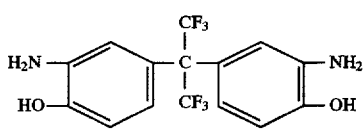

[hereinafter referred to as bis (aminophenol) AF]

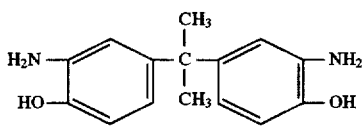

The fluorine-containing elastomer composition comprising the above-mentioned components as essential ones can further contain an inorganic filler such as carbon black, silica, etc., an acid acceptor such as oxide, hydroxide or stearate of a divalent metal, litharge, etc., and other additives, as desired. The composition can be prepared by kneading in rolls, kneader, Bambury mixer, etc. Cross-linking of the composition is carried out by heating at about 100° to about 250° C. for about 1 to about 120 minutes. Secondary vulcanization, when desired, is preferably carried out at about 150° to about 280° C. for not more than about 30 hours in an inert atmosphere such as a nitrogen atmosphere.

The present inventors disclose in JP-A-6-263952 that a perfluoro(ω-cyanoalkyl vinyl ether) represented by the general formula: $CF_2=CFO(CF_2)_nCN$ (wherein n: 2–12) is copolymerized as a cross-linking site monomer in place of the cyano group-containing (perfluorovinylether) disclosed in aforementioned JP-A-59-109546 with tetrafluoroethylene, perfluoro(lower alkyl vinyl ether) and a bis(aminophenyl) compound represented by the foregoing general formula is used as a cross-linking agent for the terpolymer.

The nitrile group of the above-mentioned terpolymer is a primary nitrile group, whereas the nitrile group of the present terpolymer is a secondary nitrile group, which has been considered to hardly form an oxazole ring with an o-aminophenol compound due to the steric hindrance and to be not practical [Journal of Fluorine Chemistry, Vol. 8 Page 295 (1976)].

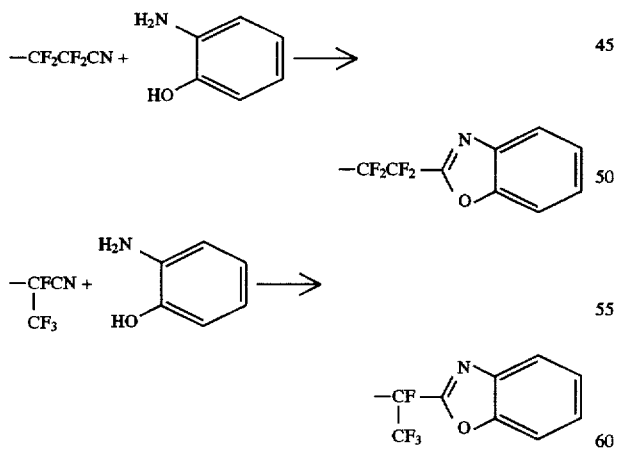

The secondary nitrile group of the present terpolymer has a higher selectivity to the oxazole ring formation reaction than that of the primary nitrile group, and the compression set can be improved.

The secondary nitrile group of the monomer is less susceptible to chain transfer than the primary nitrile group and polymers of higher molecular weight can be obtained. Thus, the physical properties such as compression set can be largely improved.

According to the present invention, there is provided a fluorine-containing elastomer composition capable of producing vulcanized rubber products having good vulcanization physical properties and a good compression set with a commercially available, ordinary cross-linking agent free from any safety problem, as contained therein, the composition comprising a cross-linking site monomer which can be readily synthesized with a good selectivity.

PREFERRED EMBODIMENTS OF THE INVENTION

Figure 1:
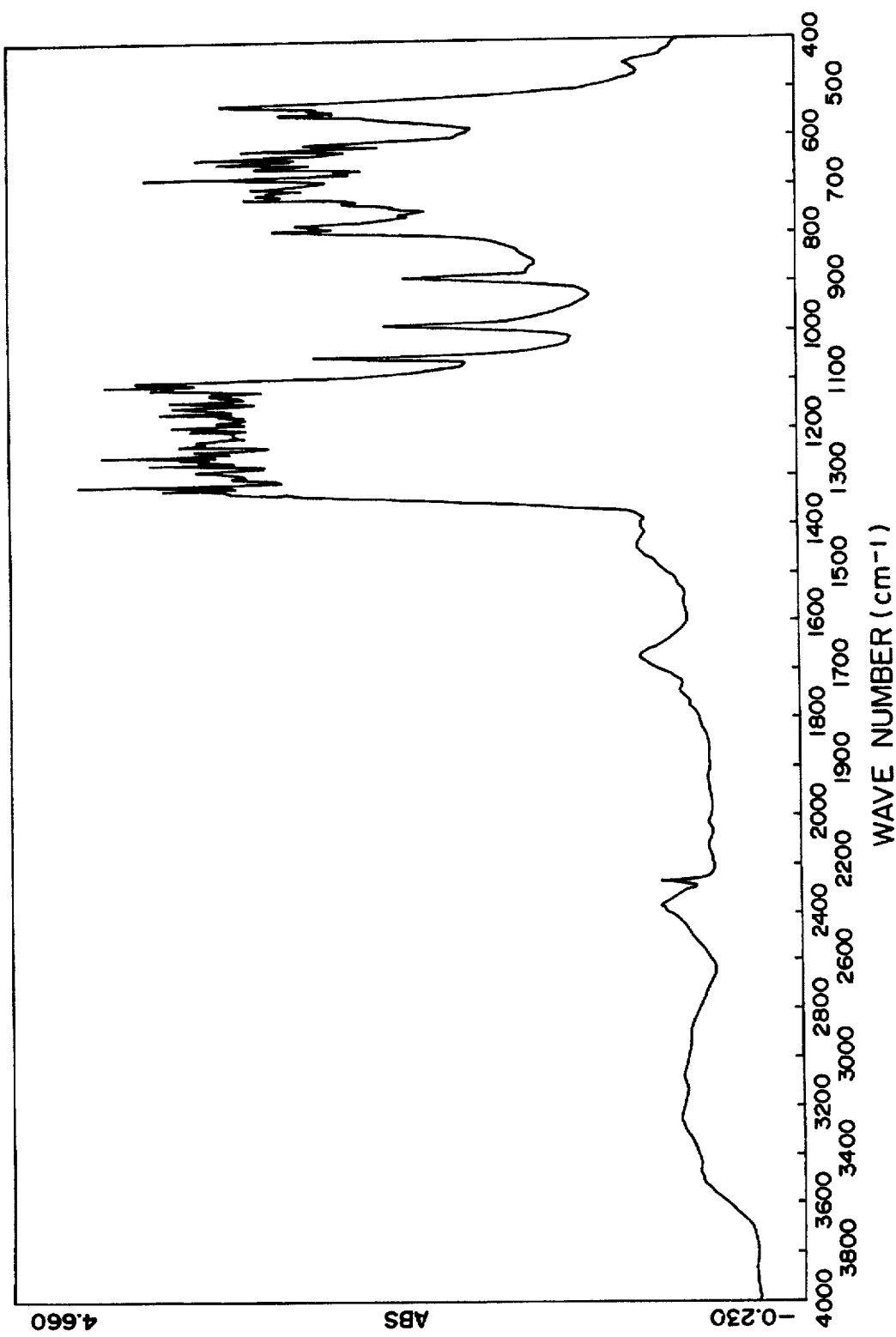
FIG. 1 is a diagram showing infrared absorption spectra of the terpolymer obtained Example 1.

The present invention will be explained in detail below, referring to Reference Examples, Examples and Comparative Examples.

REFERENCE EXAMPLE 1

(1) 422 g of methyl perfluoro(2-methyl-3,7-diox a-8-nonanoate) having the following chemical formula:

$$CF_2=CFO(CF_2)_3OCF(CF_3)COOCH_3$$

and 300 g of F-113 were charged into a three-necked glass flask having a net capacity of 1 liter, provided with a stirrer, a dropping funnel and a cooling pipe, and 160 g of bromine was dropwise added thereto from the dropping funnel over one hour, while keeping the flask inside at 40° C. After the dropwise addition, the resulting reaction mixture was washed successively with an aqueous 5% sodium hydrogen sulfite solution and water. The organic layer was dried over magnesium sulfated, filtered and distilled, whereby 582 g of methyl perfluoro(2-methyl-3,7-dioxa-8,9-dibromo-8-nonanoate) was obtained (yield: 100%).

Boiling point:
87°–88° C. (5 Torr).

$d_4^{20}$: 1.8801, $n_D^{20}$: 1.3510

$^{19}$F-NMR (internal standard: $CFCl_3$):

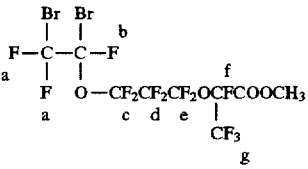

a=−60.7 ppm
b=−68.5
c=−83.5
d=−126.7
e=−76.1, −79.8
f=−128.9
g=−80.1

(2) 582 g of the thus obtained methyl-perfluoro(2-methyl-3, 7-dioxa-8,9-dibromo-8-nonanoate) and 400 g of F-113 were charged into a three-necked glass flask having a net capacity of 1 liter, provided with a stirrer, a gas feed tube and a dry ice cooling pipe, and 20 g of Ammonia gas was slowly introduced into the flask with stirring, while keeping the flask inside at a lower temperature than 30° C. After heat release was finished in the flask, stirring was further continued for 8 hours. Then, the solvent, ammonia and formed methanol were removed from the flask by distillation in reduced pressure, and then the residues were further distilled in reduced pressure, whereby 540 g of perfluoro(2-methyl-3,7-dioxa-8,9-dibromo-8-nonanamide) having a melting point of 70°~75° C. was obtained as white crystals (yield: 95%).

(3) 540 g of the thus obtained perfluoro(2-methyl-3,7-dioxa-8,9-dibromo-8-nonanamide) and 250 g of phosphorus pentoxide were mixed together, pulverized and charged into a glass flask having a net capacity of 2 liters. After heating at 160°~170° C. for 10 hours, the reaction mixture was distilled in reduced pressure, and the resulting crude product was further distilled under reduced pressure while keeping a small amount of phosphorus pentoxide therein, whereby 459 g of perfluoro(2-methyl-3,7-dioxa-8,9-dibromo-8-nonanitrile) was obtained (yield: 87%).

Boiling point: 72° C. (25 Torr), $d_4^{20}$: 1.9281, $n_D^{20}$: 1.3382

$^{19}$F-NMR (internal standard: CFCl$_3$):

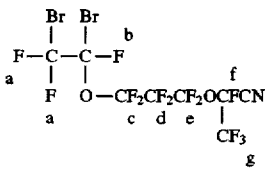

a=−60.8 ppm
b=−68.9
c=−79.4, −81.6
d=−126.6
e=−79.4, −83.8
f=−112.0
g=−81.6

(4) 65 g of zinc powder, 1 g of zinc bromide and 1 liter of dioxane were charged into a four-necked glass flask having a net capacity of 2 liters, provided with a stirrer, a thermometer, a dropping funnel and a cooling pipe, and heated to the reflux temperature with vigorous stirring, and then 459 g of the thus obtained perfluoro(2-methyl-3,7-dioxa-8,9-dibromo-8-nonanitrile) was dropwise added thereto over 2 hours. After the dropwise addition, the solvent and the product mixture were removed from the flask by distillation, and the thus obtained product mixture was washed with water 4 times, and the organic layer was dried over magnesium sulfate and filtered. The thus obtained filtrate was distilled, whereby 280 g of perfluoro(2-methyl-3,7-dioxa-8-nonenonitrile) was obtained (yield: 89%).

Boiling point: 103°~104° C. $d_4^{20}$: 1.5951, $n_D^{20}$: 1.2870

$^{19}$F-NMR (internal standard: CFCl$_3$):

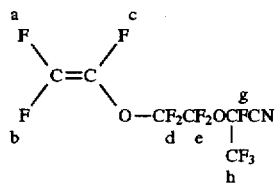

a=−115.6 ppm (dd,Jac=67 Hz,Jab=87 Hz)
b=−123.2 (dd,Jab=87 Hz,Jbc=113 Hz)
c=−137.0 (dd,Jac=67 Hz,Jbc=113 Hz)
d=−86.0 (s)
e=−129.5 (s)
f=−82.5, −85.1 (AB,J=145 Hz)
g=−115.0 (m)
h=−85.0 (s)

REFERENCE EXAMPLE 2

(1) 33 g of zinc powder and 200 ml of dioxane were charged into a four-necked glass flask having a net capacity of 500 ml, provided with a stirrer, a dropping funnel and a cooling pipe, and heated to the reflux temperature with vigorous stirring. Then, 141 g of perfluoro(2-methyl-3,7-dioxa-8,9-dibromo-8-nonanamide) obtained in Example 1 (2) was dropwise added thereto. After the dropwise addition, dioxane was removed therefrom by distillation, and 200 ml of toluene was added to the residues, and the resulting mixture was heated to the reflux temperature and filtered while hot. Toluene was removed from the filtrate by distillation, whereby 61 g of crude perfluoro(2-methyl-3,7-dioxa-8-nonenamide) was obtained.

(2) 61 g of the thus obtained crude perfluoro(2-methyl-3,7-dioxa-8-nonenamide) and 21 g of phosphorus pentoxide were subjected to reaction under the same conditions as in Example 2 (2), whereby 50 g of perfluoro(2-methyl-3,7-dioxa-6-nonenonitrile) was obtained (total yield: 52%).

EXAMPLE 1

After replacement of the inside gas in an autoclave having a capacity of 1 liter with an argon gas and successive evacuation of the autoclave, 440 g of distilled water, 1.1 g of ammonium persulfate, 4.6 g of potassium dihydrogen phosphate, 4.4 g of a mixture of ammonium perfluorooctanoate-ammonium perfluorodeccanoate (in a ratio of 60 : 40 by weight) and 0.3 g of sodium sulfite were charged into the autoclave. Then, a monomer mixture consisting of 17.8 g of perfluoro(2-methyl-3,7-dioxa-8-nonenonitrile) [FCV-82: n=3 in the foregoing general formula] obtained in Reference Example 1, 136.7 g of perfluoro (methyl vinyl ether) [FMVE] and 63.5 g of tetrafluoroethylene [TFE] (in a ratio of 3:54:43 by mole) was charged into the autoclave until the inside pressure reached 6 to 7 kgf/cm$^2$ gage. Then, the autoclave was heated to 60° C., and the monomer mixture was further charged into the autoclave until the inside pressure reached 11 kgf/cm$^2$ gage.

The monomer mixture was supplementarily added to the autoclave so as to maintain the polymerization pressure at 10 to 11 kgf/cm$^2$ gage, white keeping the polymerization temperature at 60° C. Thereafter, the reaction was continued at that polymerization temperature for 23 hours. The inside pressure of the autoclave was lowered to 3.6 kgf/cm$^2$ gage from 11 kgf/cm$^2$ gage. Then, the unreacted mixture was discharged from the autoclave, and the reaction mixture was freezed and coagulated to precipitate the coplymers. The precipitated copolymers were washed with hot water and then with ethanol, and dried at 60° C. under reduced pressure, whereby 169.8 g of white terpolymer A (intrinsic viscosity η sp/c=0.75) was obtained.

Infrared absorption spectra: Fig.1

$^{19}$F-NMR (internal standard: CFCl$_3$):

−51.8 ppm (—OCF$_3$)
−120~110 ppm (—CF$_2$—)
−136~130 ppm (—CF—)

EXAMPLE 2

Polymerization reaction was carried out 60° C. in the same manner as in Example 1, except that the amount of the mixture of ammonium perfluorooctanoate-ammonium perfluorodeccanoate was changed to 6.6 g and a monomer mixture consisting of 23.9 g of FCV-82, 122.4 g of FMVE and 73.7 g of TFE (in a ratio of 4:48:48 by mole) was charged into the autoclave at once. The reaction was continued for 18 hours, and when the inside pressure of the autoclave reached 4 kgf/cm² gage, the reaction was discontinued, whereby 176.0 g of white terpolymer B (intrinsic viscosity η sp/c=0.76) was obtained.

EXAMPLE 3

Polymerization reaction was carried out 60° C. in the same manner as in Example 1, except that the amount of the mixture of ammonium perfluorooctanoate-ammonium perfluorodeccanoate was changed to 6.6 g and a monomer mixture consisting of 12.39 g of FCV-82, 129.56 g of FMVE and 78.05 g of TFE (in a ratio of 2:49:49 by mole) was charged into the autoclave at once. The reaction was continued for 18 hours, and when the inside pressure of the autoclave reached 4 kgf/cm² gage, the reaction was discontinued, whereby 180.0 g of white terpolymer C (intrinsic viscosity ηsp/c=0.77) was obtained.

It was found by ¹⁹F-NMR that the individual terpolymers obtained in the foregoing Examples 1, 2 and 3 had the following polymer compositions (% by mole):

| Terpolymer | FCV-82 | FMVE | TFE |
|---|---|---|---|
| A | 2.9 | 49.1 | 48.0 |
| B | 3.8 | 45.6 | 50.6 |
| C | 1.6 | 45.0 | 53.4 |

COMPARATIVE EXAMPLE 1

165.0 g of white terpolymer D (intrinsic viscosity η sp/c=0.46) was obtained in the same manner as in Example 1, except that same amount of the perpluoro(7-oxa-8-nonenonitrile) $CF_2=CFO(CF_2)_5CN$ [5CNVE] was used in place of FCV-82.

It was found by ¹⁹F-NMR that the terpolymer D had the following polymer compositions:

| 5CNVE | 2.9 mol % |
|---|---|
| FMVE | 49.4 mol % |
| TFE | 47.7 mol % |

Then, 20 parts by weight of MT carbon black and one part by weight of bis(aminophenol)AF were added each to 100 parts by weight of the terpolymers A to D, obtained in the foregoing Examples 1 to 3 and Comparative Example 1, and kneaded in a roll mill. The thus obtained kneaded mixture were subjected to primary (press) vulcanization at 160° C. for 30 minutes and secondary (oven) vulcanization at 250° C. for 22 hours. The thus obtained vulcanized products were subjected to measurement of normal state physical properties and compression set.

The results are shown below:

| Terpolymer | | A | B | C | D |
|---|---|---|---|---|---|
| [Normal state physical properties] | | | | | |
| 100% modulus | (kg/cm²) | 76 | | | 150 |

| Terpolymer | | A | B | C | D |
|---|---|---|---|---|---|
| Tensile strength | (kg/cm²) | 179 | 86 | 76 | 167 |
| Elongation | (%) | 153 | 90 | 140 | 114 |
| [Compression set] | | | | | |
| 275° C. for 70 hrs | (%) | 15 | | | (broken) |

COMPARATIVE EXAMPLE 2

196.3 g of white terpolymer E (intrinsic viscosity η sp/c=0.44) was obtained in the same manner as in Example 1, except that same amount of $CF_2=CFOCF_2CF(CF_3)O(CF_2)_2CN$ [FCV-80] was used in place of FCV-82.

It was found by ¹⁹F-NMR that the terpolymer E had the following polymer compositions:

| FCV-80 | 3.1 mol % |
|---|---|
| FMVE | 39.6 mol % |
| TFE | 57.3 mol % |

Then, 15 parts by weight of MT carbon black and one part by weight of bis(aminophenol) were added each to 100 parts by weight of the thus obtained terpolymer E and kneaded in a roll mill. The thus obtaiend kneaded product was subjected to primary (press) vulcanization at 180° C. for 30 minutes and secondary (oven) vulcanization at 250° C. for 24 hours. The vulcanized product was subjected to measurement of normal state physical properties and compression set.

The results are given below:

| [Normal state physical properties] | |
|---|---|
| 100% modulus | 34 kg/cm² |
| Tensile strength | 114 kg/cm² |
| Elongation | 230% |
| [Compression set] | |
| 275° C. for 70 hrs | 60% |

What is claimed is:

1. A fluorine-containing elastomer composition, which comprises a terpolymer of tetrafluoroethylene, perfluoro (lower alkyl vinyl ether) and a perfluoro unsaturated nitrile compound represented by the following general formula:

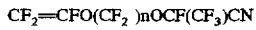

$$CF_2=CFO(CF_2)_nOCF(CF_3)CN$$

wherein n is an integer of 2 to 5, and a bis(aminophenyl) compound represented by the following general formula as a cross-linking agent:

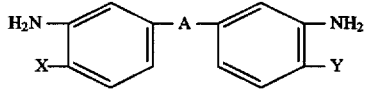

wherein A is an alkylidene group having 1 to 6 carbon atoms or a perfluoroalkylidene group having 1 to 10 carbon atoms and X and Y are a hydroxyl group or an amino group.

2. A fluorine-containing elastomer composition according to claim 1, wherein the terpolymer is one comprising about 45 to about 75% by mole of tetrafluoroethylene, about 50 to about 25% by mole of perfluoro(lower alkyl vinyl ether) and about 0.1 to about 5% by mole of a perfluoro unsaturated nitrile compound represented by the following general formula:

$CF_2=CFO(CF_2)_nOCF(CF_3)CN$ wherein n is an integer of 2 to 5, sum total being 100% by mole.

3. A fluorine-containing elastomer composition according to claim 1, wherein about 0.1 to about 5 parts by weight of the bis(aminophenyl) compound is contained as the crosslinking agent per 100 parts by weight of the terpolymer.

* * * * *